(12) United States Patent
Amei (10) Patent No.: US 7,012,816 B2
(45) Date of Patent: Mar. 14, 2006

(54) SELF-EXCITED SWITCHING POWER SUPPLY CIRCUIT

(75) Inventor: Toshihiro Amei, Nei-gun (JP)

(73) Assignee: SMK Corporation, Tokyo (JP)

( * ) Notice: Subject to any disclaimer, the term of this patent is extended or adjusted under 35 U.S.C. 154(b) by 45 days.

(21) Appl. No.: 10/859,632

(22) Filed: Jun. 2, 2004

(65) Prior Publication Data
US 2004/0252526 A1    Dec. 16, 2004

(30) Foreign Application Priority Data
Jun. 16, 2003    (JP)    ............................. 2003-170215

(51) Int. Cl.
*H02M 3/335*    (2006.01)
(52) U.S. Cl. .............................. 363/19; 363/50; 363/55
(58) Field of Classification Search .................. 363/18, 363/19, 50, 55, 56.09
See application file for complete search history.

(56) References Cited

U.S. PATENT DOCUMENTS

| | | | | |
|---|---|---|---|---|
| 6,078,508 A | * | 6/2000 | Okamura et al. | 363/19 |
| 6,137,695 A | * | 10/2000 | Takida et al. | 363/19 |
| 6,198,637 B1 | * | 3/2001 | Hosotani et al. | 363/19 |
| 6,285,566 B1 | * | 9/2001 | Nakahira et al. | 363/19 |
| 6,552,623 B1 | * | 4/2003 | Nishida et al. | 331/111 |
| 6,577,511 B1 | * | 6/2003 | Yamaguchi et al. | 363/21.07 |
| 6,862,193 B1 | * | 3/2005 | Nakata | 363/15 |

FOREIGN PATENT DOCUMENTS

JP    2002-051546    2/2002

OTHER PUBLICATIONS

Patent Abstracts of Japan for JP2002-051546 published on Feb. 15, 2002.

* cited by examiner

*Primary Examiner*—Bao Q. Vu
(74) *Attorney, Agent, or Firm*—Darby & Darby (57) ABSTRACT

A self-excited switching power supply circuit is provided which reduces a discharge current generated when an oscillating field effect transistor (3) is turned on, whereby it is possible to reduce energy loss and generation of noise when switching is executed. A time constant of an ON-control circuit (12, 23) is set such that when a polarity of a voltage of a feedback winding (2b) has reversed, a gate voltage of the oscillating field effect transistor (3) exceeds a threshold voltage $V_{TH}$. Accordingly, after a voltage of a primary winding (2a) has become equal to or less than a power supply voltage, the oscillating field effect transistor (3) is turned on, and electrical charge stored in stray capacitance between the windings of the primary winding (2a) and in parasitic capacitance of the oscillating field effect transistor (3) is discharged gradually.

2 Claims, 8 Drawing Sheets

SELF-EXCITED SWITCHING POWER SUPPLY CIRCUIT

INCORPORATION BY REFERENCE

The present application claims priority under 35 U.S.C. §119 to Japanese Patent Application No. 2003-170215 filed on Jun. 16, 2003. The content of the application is incorporated herein by reference in its entirety.

FIELD OF THE INVENTION

The present invention relates to a self-excited switching power supply circuit, and more particularly, to a flyback-type self-excited switching power supply circuit that, when a current of a primary winding of a transformer is stopped, causes energy stored in the transformer to be discharged from a secondary output winding.

BACKGROUND OF THE INVENTION

Switching power supply circuits are utilized in battery chargers, AC adapters, and the like, because they offer a stable power supply. Drive methods (switching methods) for switching devices can be classified into two main types: self-excited oscillation and externally-excited oscillation. In the self-excited oscillation type, positive feedback of a drive signal, which indicates a voltage generated in a feedback winding of an inductance device like a transformer, is executed. The drive signal is fedback to a control terminal of a switching device to cause an oscillation operation thereof.

Figure 4:
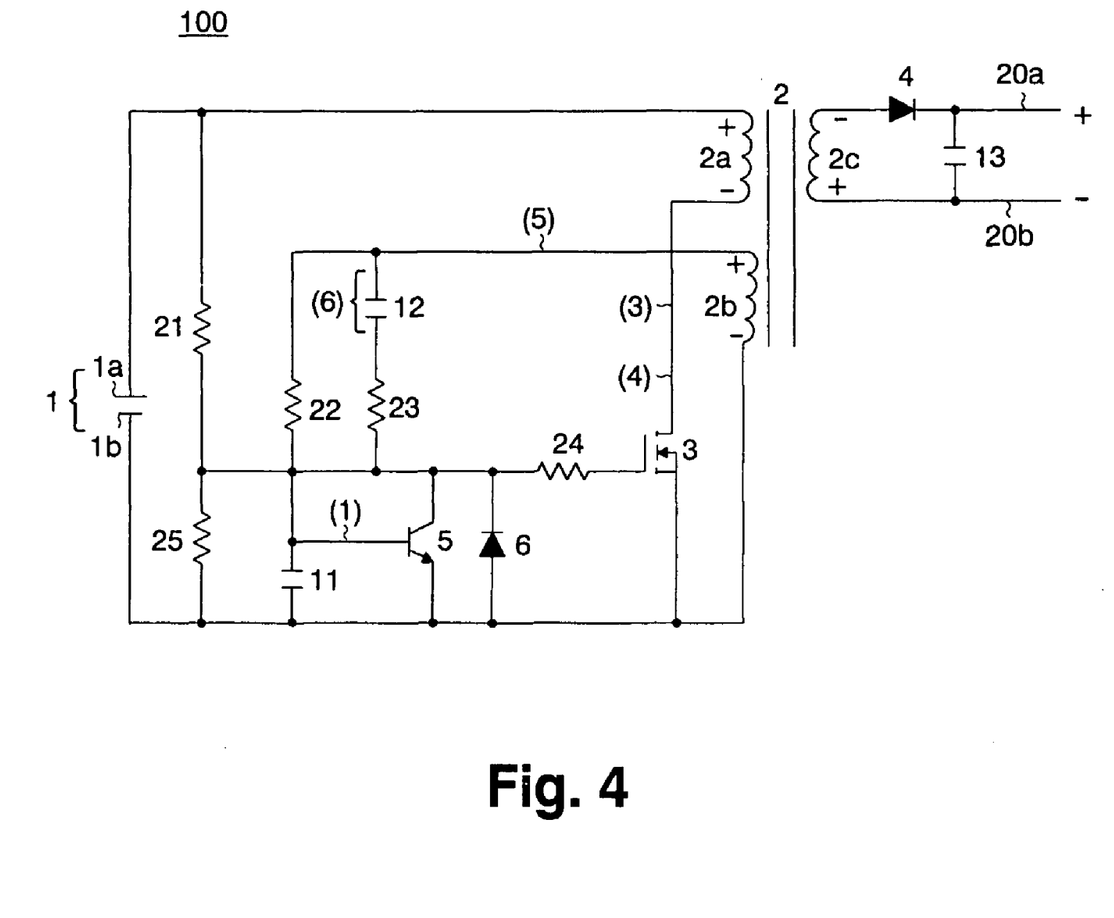
FIG. 4 is a circuit diagram of a conventional self-excited switching power supply circuit 100.

As this type of self-excited switching power supply circuit, examples are known such as the circuit shown in FIG. 4 (for example, Japanese Patent Laid-Open Publication No. 2002-051546). Hereinafter, this conventional self-excited switching power supply circuit 100 will be explained with reference to FIGS. 4 to 6. In FIG. 4, a direct current power supply 1 is an unstable power supply with a fluctuating voltage. This direct current power supply 1 has a high voltage side terminal 1a and a low voltage side terminal 1b. A transformer 2 is configured from a primary winding 2a, a feedback winding 2b that is provided on the primary side, and a secondary output winding 2c. Further, a field effect transistor (hereinafter referred to as "FET") 3 for oscillation is also provided. A start-up resistor 21 is utilized to apply a forward bias (in other words, a gate voltage equal or more than a threshold voltage $V_{TH}$) to a gate of the FET 3 during circuit start-up. An electrical resistor 25, which is connected in-series with the start-up resistor 21, has a resistance that is small as compared to that of the start-up resistor 21. Accordingly, voltage of the direct current power supply 1 is divided such that the circuit does not start-up when a low direct current voltage is output.

Further, the self-excited switching power supply circuit 100 is also provided with: a Zener diode 6 that prevents excessive input to the gate; a feedback capacitor 12 which is connected in-series between the feedback winding 2b and the gate of the FET 3 and which, along with a feedback resistor 23, configures an ON-control circuit; an electrical resistor 24 that prevents excessive input to the gate; and an OFF-control transistor 5 that connects a collector to the gate, and an emitter to the low voltage side terminal 1b. A control resistor 22 configures an oscillation stabilization circuit along with an OFF-control capacitor 11. A junction of this control resistor 22 and the OFF-control capacitor 11 is connected to a base of the OFF-control transistor 5.

A rectifying diode 4 and a smoothing capacitor 13, which are provided on the secondary output winding 2c side, configure a rectifying smoothing circuit. The diode 4 and the smoothing capacitor 13 rectify and smooth an output of the secondary output winding 2c, and the output is then output between a high voltage side output line 20a and a low voltage side output line 20b.

With the self-excited switching power supply circuit 100 configured as described above, a direct current voltage is applied to the high voltage side terminal 1a and the low voltage side terminal 1b of the power supply 1 to charge the feedback capacitor 12 via the start-up resistor 21 (in FIG. 4, the electrode toward the bottom is positive, and that toward the top is negative). Accordingly, the charge voltage of the feedback capacitor 12 rises gradually.

When the charge voltage of the feedback capacitor 12 reaches the threshold voltage $V_{TH}$, positive bias voltage is applied to the gate of the FET 3, and the FET 3 is turned on (there is electrical continuity between the drain and the source).

Next, a self-excited oscillation operation executed after the FET 3 turns on will be explained with reference to FIGS. 5 and 6.

Figure 5A:
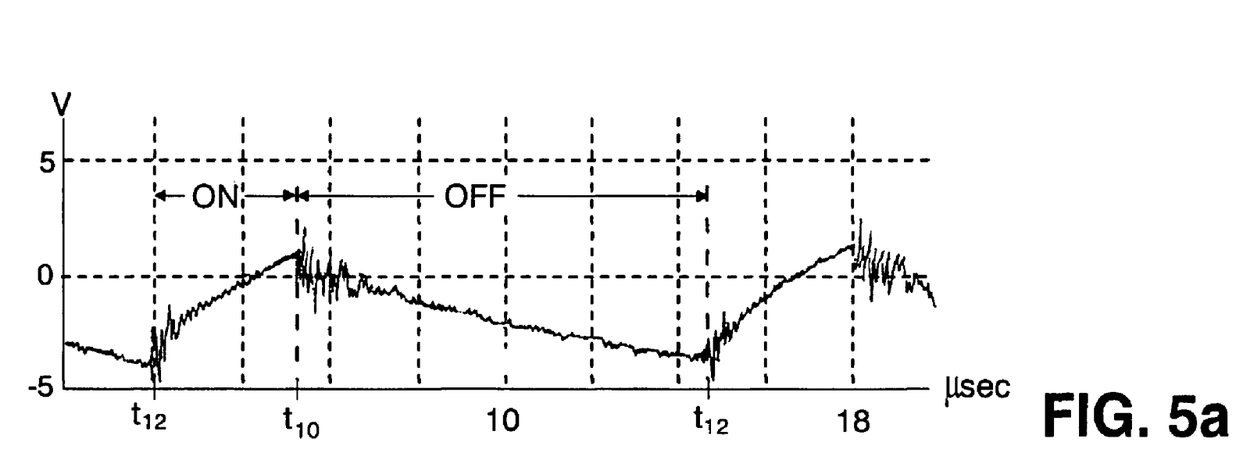
FIGS. 5a–5d show waveform diagrams for respective sections of the conventional self-excited switching power supply circuit 100 when self-excited oscillation operation is being executed with (a) showing a base voltage waveform (1) of the OFF-control transistor 5; (b) showing a gate voltage waveform (2) of the FET 3; (c) showing a drain current waveform (3) of the FET 3; and (d) showing a drain voltage waveform (4) of the FET 3.
Figure 5B:
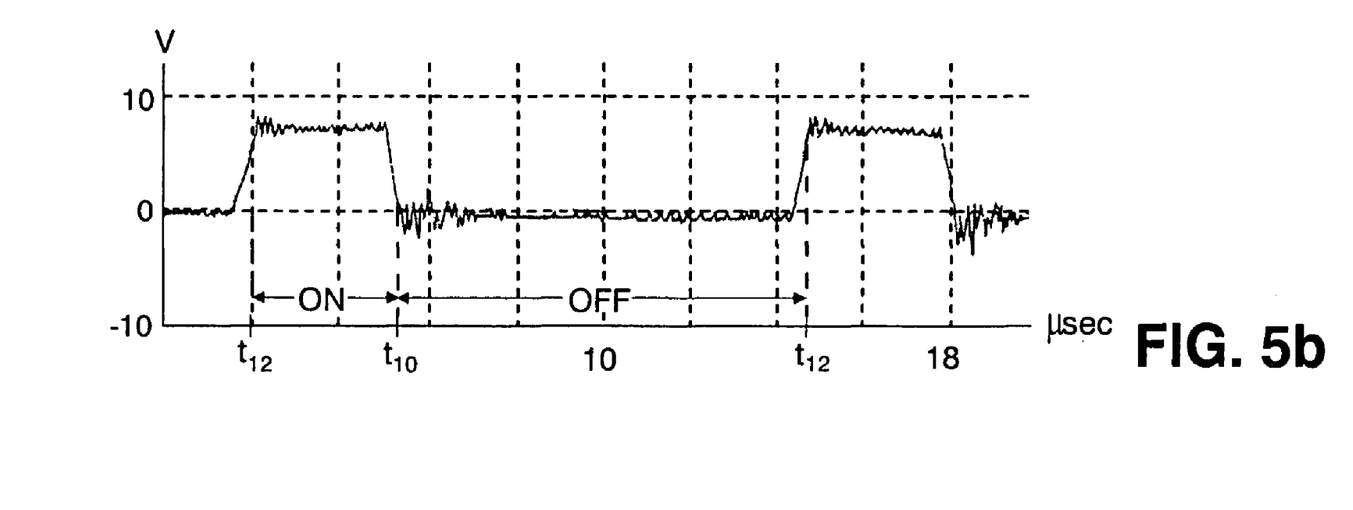
Figures 5C, 5D:
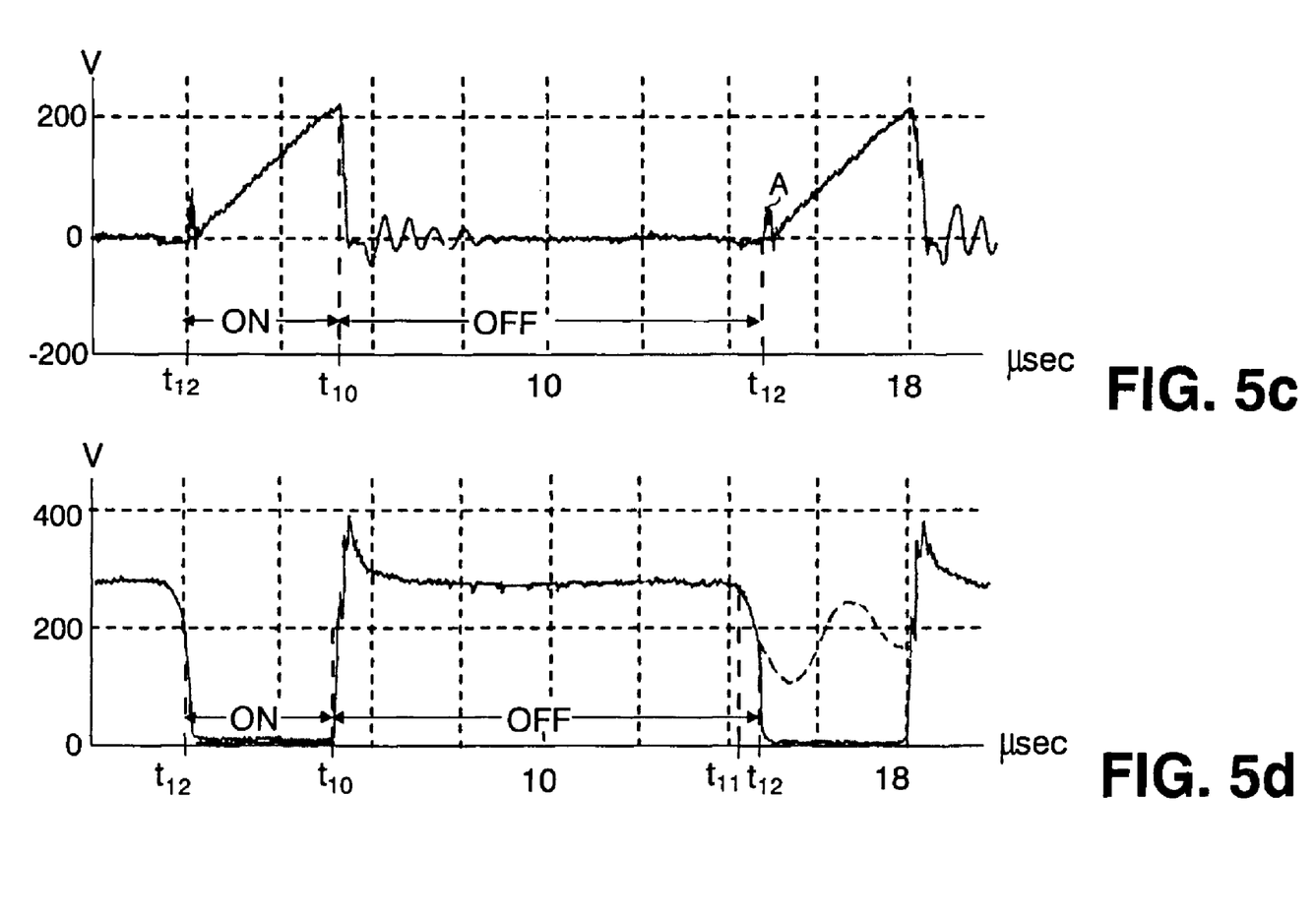
Figure 6:
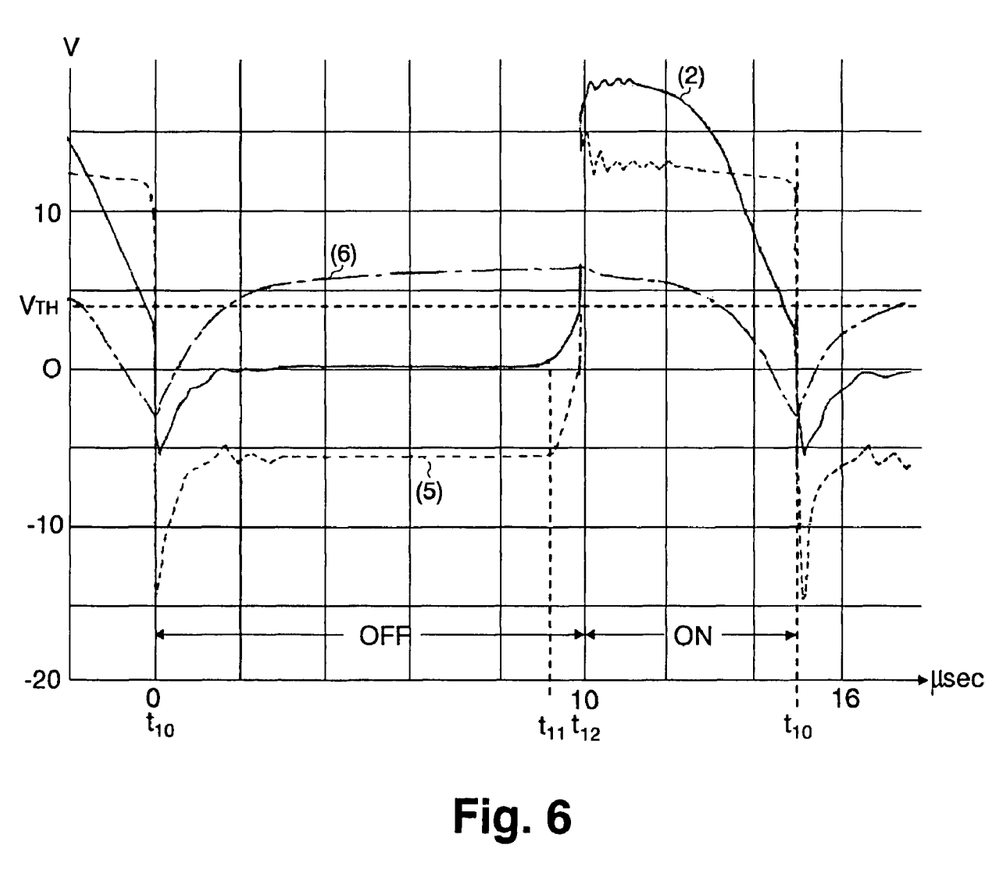
FIG. 6 is a graph showing respective enlarged waveform diagrams, for respective sections of the conventional self-excited switching power supply circuit 100 when self-excited oscillation operation is being executed with the gate voltage waveform (2) of the FET 3 and a voltage waveform (5) of the first feedback winding 2b side terminal of the feedback capacitor 12 and a charge voltage waveform (6) of the feedback capacitor 12.

FIGS. 5 and 6 show respective operation waveforms for the sections indicated by reference numbers (1) to (6) in FIG. 4, when the conventional self-excited switching power supply circuit 100 is caused to execute self-excited oscillation under conditions in which the power supply voltage of the direct current power supply 1 is applied at 200V. The resistances of the start-up resistor 21 and the electrical resistor 25 are set respectively at 1.5 MΩ and 100 kΩ. The capacity of the feedback capacitor 12 and the resistance of the feedback resistor 23 are set respectively at 0.01 μF, and 100 Ω.

After the FET 3 is turned on, an exciting current starts to flow from the direct current power supply 1 to the primary winding 2a that is connected in-series therewith. An induced electromotive force is generated in each of the windings of the transformer 2 (refer to the voltage waveform of the feedback winding 2b indicated by the section between time $t_{12}$ and time $t_{10}$ in (5) of FIG. 6). Accordingly, excitation energy is stored in the transformer 2. At this time, the voltage that is generated in the feedback winding 2b as a drive signal charges the OFF-control capacitor 11 via the control resistor 22. Consequently, a base voltage of the OFF-control transistor 5 rises (refer to the section between time $t_{12}$ and time $t_{10}$ in (a) of FIG. 5).

Further, during an ON period of the FET 3 between time $t_{12}$ and time $t_{10}$, an induced voltage generated in the feedback winding 2b (refer to (5) of FIG. 6) is superimposed on a charge voltage (refer to (6) of FIG. 6) of the feedback capacitor 12, and thus the gate voltage of the FET 3 (refer to (2) of FIG. 6) is maintained at equal to or more than the threshold voltage $V_{TH}$ thereof. At this time, the Zener diode 6 prevents excessive input to the gate.

When the OFF-control capacitor 11 is charged, and the charge voltage thereof (the base voltage of the OFF-control transistor 5) has become equal to or more than a bias voltage (refer to time $t_{10}$ in (a) of FIG. 5), a base current flows in the OFF-control transistor 5. Therefore, electrical continuity is established between the collector and emitter. Accordingly, because of the OFF-control transistor 5, the gate of the FET 3 is effectively short circuited by the low voltage side terminal 1b and the FET 3 is turned off (refer to (b) of FIG. 5 and (2) of FIG. 6).

When the FET 3 is turned off in this way, the current flowing in the transformer 2 is effectively interrupted, and a so-called flyback voltage (an induced counter-electromotive force) is generated in the windings (refer to the section between time $t_{10}$ and time $t_{11}$ in (d) of FIG. 5). At this time, the flyback voltage generated in the secondary output winding 2c is rectified and smoothed by the rectifying smoothing circuit formed by the rectifying diode 4 and the smoothing capacitor 13, and then output as electric power supplied to a load connected between the high and low voltage output lines 20a and 20b.

The flyback voltage generated in the feedback winding 2b has a proportional relationship with the flyback voltage generated in the secondary output winding 2c because of the load connected to the output side. As a result of the flyback voltage generated in the feedback winding 2b (refer to the section between time $t_{10}$ and time $t_{11}$ of (5) in FIG. 6), the feedback capacitor 12 is charged (refer to the section between time $t_{10}$ and time $t_{11}$ of (6) in FIG. 6; in FIG. 4, the bottom electrode is positive, and the top one negative).

At this time, the Zener diode 6 applies a reverse bias to the gate of the FET 3, and acts as a charging current path for charging the feedback capacitor 12 from the low voltage side terminal 1b side.

After the electric energy stored in the secondary output winding 2c caused by the induced counter-electromotive force is discharged (refer to (d) of FIG. 5, and time $t_{11}$ of FIG. 6), the flyback voltage of the feedback winding 2b that is reverse biased on the gate is reduced (refer to the section between time $t_{11}$ and time $t_{12}$ of (5) in FIG. 6). Thus, the gate voltage of the FET 3 exceeds the threshold voltage $V_{TH}$ (refer to (b) of FIG. 5 and time $t_{12}$ in (2) of FIG. 6) because of the charge voltage that has been held in the feedback capacitor 12 up to this time (refer to (6) of FIG. 6), and the FET 3 is turned on once again. In this way, a series of oscillation operations are repeated.

In this conventional self-excited switching power supply circuit 100, a time constant for the ON-control circuit formed by the feedback capacitor 12 and the feedback resistor 23 is determined. This leads to the feedback capacitor 12 being rapidly charged using the flyback voltage (refer to the section between time $t_{10}$ and time $t_{11}$ of (5) in FIG. 6) generated in the feedback winding 2b.

In other words, the time constant for the ON-control circuit is set such that the feedback capacitor 12 substantially reaches the charge voltage (the flyback voltage) before time $t_{11}$ when the energy stored in the transformer 2 is discharged from the secondary output winding 2c. Accordingly, when the energy is discharged from the transformer 2 and the flyback voltage is reduced, the FET 3 swiftly moves to the next operation period.

As shown in (d) of FIG. 5, as a result of turning the FET 3 on, the drain (the primary winding 2a side) voltage of the FET 3 changes from roughly 200V (power supply voltage) to 0V at time $t_{12}$, and then a current begins to flow from the direct current power supply 1.

However, stray capacitance in the windings and parasitic capacitance between the drain and source exist in the primary winding 2a and the FET 3, respectively, and these capacitances are charged by a flyback voltage that makes the bottom side of the primary winding 2a in FIG. 4 a high voltage side during the OFF period of the FET 3. Thus, when the FET 3 is turned on while the drain (the primary winding 2a side) voltage of the FET 3 has not reduced sufficiently, namely, is around 200V, discharge is executed abruptly.

As a result, a large discharge current is generated as shown by A of (c) of FIG. 5, which causes loss of switching devices like the FET 3 to increase, and is a cause of noise.

SUMMARY OF THE INVENTION

In light of the aforementioned circumstances, it is an object of the present invention to provide a self-excited switching power supply circuit which reduces a discharge current generated when an oscillating field effect transistor is turned on. Thus, it is possible to reduce energy loss and generation of noise when switching is executed.

To address the above problems, according to a first aspect of the invention, a self-excited switching power supply circuit includes a transformer provided with a primary winding, a secondary output winding, and a feedback winding; an oscillating field effect transistor which is connected in-series with the primary winding to a direct current power supply and which is turned on when a gate voltage reaches a threshold voltage $V_{TH}$; a start-up resistor that is connected between a high voltage side terminal of the direct current power supply and the gate of the oscillating field effect transistor; an ON-control circuit which is formed from a feedback capacitor and a feedback resistor that are connected in-series between the feedback winding and the gate of the oscillating field effect transistor; and an OFF-control transistor which is connected between the gate of the oscillating field effect transistor and a low voltage side terminal of the direct current power supply, and which, following turn on operation of the oscillating field effect transistor, turns off the oscillating field effect transistor after a predetermined time has elapsed by causing electrical continuity to be established between the gate and the low voltage side terminal. After turning the oscillating field effect transistor off, the gate voltage is raised to the threshold voltage $V_{TH}$ by a charge voltage of the feedback capacitor that is charged by a flyback voltage generated in the feedback winding. Thus, the oscillating field effect transistor is turned on once again. A time constant of the ON-control circuit is set such that the gate voltage exceeds the threshold voltage $V_{TH}$ when, at the least, a polarity of a voltage of the feedback winding has reversed because of discharge of energy stored in the transformer from the secondary output winding.

When energy stored in a transformer is discharged, free oscillation of a primary winding voltage around a power supply voltage starts because of parasitic capacitance of an oscillating field effect transistor, stray capacitance in a primary winding and inductance of the primary winding, and a polarity of a voltage of a feedback winding that is proportional to a primary winding voltage reverses.

When the polarity of the voltage of the feedback winding has reversed, the voltage of the primary winding which is proportional therewith also becomes equal to or less than the power supply voltage, whereby electrical charge stored in the stray capacitance in the primary winding and in the parasitic capacitance of the oscillating field effect transistor begins to be gradually discharged. Further, when the primary winding voltage becomes equal to or less than the power supply voltage, a voltage between a drain and a source of the oscillating field effect transistor also reduces.

Accordingly, at this timing, a gate voltage exceeds a threshold voltage $V_{TH}$ and the oscillating field effect transistor is turned on, whereby the discharge current generated upon turning on is reduced. Accordingly, energy loss of the oscillating field effect transistor is reduced, and generation of noise is inhibited.

According to a further configuration of the invention, the time constant of the ON-control circuit is set such that the gate voltage exceeds the threshold voltage $V_{TH}$ at a time when the voltage of the feedback winding has reached an initial maximal value because of discharge of energy stored in the transformer from the secondary output winding.

When energy stored in the transformer is discharged, free oscillation of the primary winding voltage around the power supply voltage starts because of the parasitic capacitance of the oscillating field effect transistor, the stray capacitance in the primary winding and the inductance of the primary winding, and the polarity of the voltage of the feedback winding that is proportional to the primary winding voltage reverses.

The above mentioned free oscillation decays gradually because of energy loss. Accordingly, when the voltage of the feedback winding has reached an initial maximal value, the primary winding voltage oscillates around the power supply voltage and becomes a minimal voltage.

Accordingly, at this timing, the gate voltage exceeds the threshold voltage $V_{TH}$ and the oscillating field effect transistor is turned on. Therefore, it is possible to reduce the discharge current generated upon turning on with optimal effectiveness.

DETAILED DESCRIPTION OF THE PREFERRED EMBODIMENT

Figure 1:
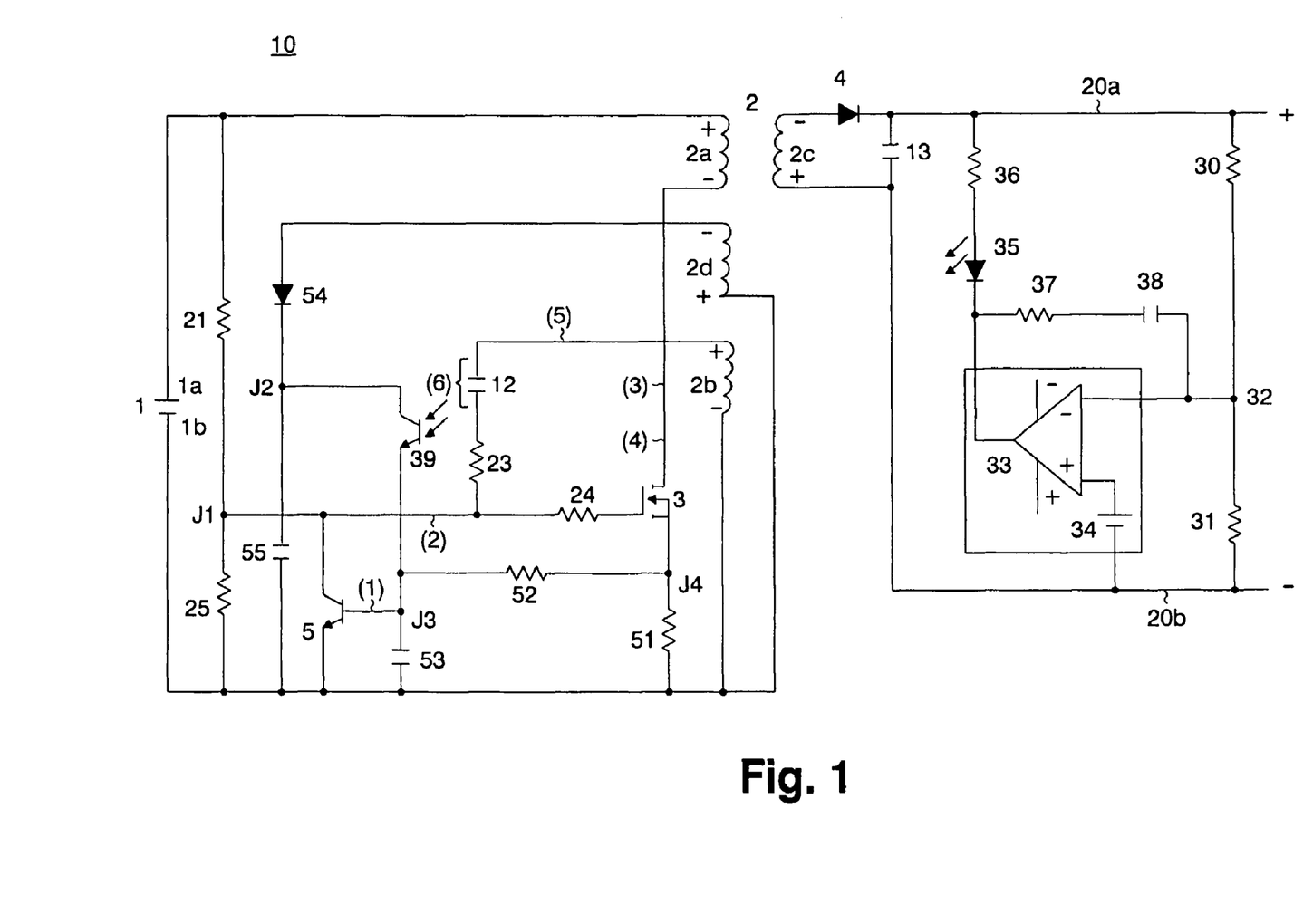
FIG. 1 is a circuit diagram of a self-excited switching power supply circuit 10 according to an embodiment of the present invention.

Hereinafter, an embodiment of the present invention will be described with reference to the drawings. FIG. 1 is a circuit diagram showing the configuration of a self-excited switching power supply circuit 10 according to the embodiment of the present invention. The basic circuit and circuit elements of the self-excited switching power supply circuit 10 according to this embodiment of the invention are the same as those of the conventional self-excited switching power supply circuit 100 as shown in FIG. 4. Accordingly, structural members that are the same have been denoted with the same reference numerals, and an explanation thereof is omitted.

In FIG. 1, a primary side of a transformer 2 is provided with a primary winding 2a; a first feedback winding 2b that is wound in the same direction as the primary winding 2a; and a second feedback winding 2d that is wound in the opposite direction to the primary winding 2a. Further, a secondary output winding 2c is provided on a secondary side of the transformer 2.

The primary winding 2a is connected in-series with a field effect transistor (hereinafter referred to as "FET") 3 for oscillation to a direct current power supply 1. Accordingly, ON/OFF control of a current flowing in the primary winding 2a can be executed by turning the FET 3 on and off.

In this example, a MOSFET has been adopted for the FET 3. The FET 3 has a drain connected to the primary winding 2a, and a source connected to a low voltage side terminal 1b of the direct current power supply 1 via a primary current detection resistor 51.

In addition, a gate of the FET 3 is connected via an electrical resistor 24 to a junction J1 of a start-up resistor 21 and an electrical resistor 25 that are connected in-series to the direct current power supply 1. The electrical resistor 24 prevents excessive input to the gate. Respective resistances of the start-up resistor 21 and the electrical resistor 25 are, like the circuit shown in FIG. 4, set at 1.5 MΩ and 100 KΩ. Accordingly, when an unstable power supply voltage of the direct current power supply 1 that is around 200 V reduces substantially, a gate voltage of the FET 3 does not reach a threshold voltage $V_{TH}$ and oscillation operation is not started.

A feedback capacitor 12 and a feedback resistor 23 that form an ON-control circuit are connected in-series between the junction J1 and the first feedback winding 2b. The other side of the first feedback winding 2b is connected to the low voltage side terminal 1b of the direct current power supply 1.

Note that, in this case, the capacity of the feedback capacitor 12 and the resistance of the feedback resistor 23 are set to 1000 pF, and 4.7 kΩ, respectively, and a time constant for the ON-control circuit is set to be 4.7 times longer than that of the conventional self-excited switching power supply circuit 100 shown in FIG. 4.

An OFF-control transistor 5 that reduces the gate voltage of the FET 3 is arranged between the junction J1 of the start-up resistor 21 and the electrical resistor 25, and the low voltage side terminal 1b. In this case, for the OFF-control transistor 5, an NPN type transformer is adopted that has a collector connected to the junction J1 and an emitter connected to the low voltage side terminal 1b.

One side of the second feedback winding 2d is connected to the low voltage side terminal 1b of the direct current power supply 1 via a diode 54 and a drive capacitor 55 that are connected in-series. Further, the other side of the second feedback winding 2d is connected to the low voltage side terminal 1b of the direct current power supply 1, whereby a closed-loop circuit is formed.

The diode 54 is arranged such that the forward direction is aligned with the charging direction of the drive capacitor 55. As a result of this arrangement, a flyback voltage generated in the second feedback winding 2d charges the drive capacitor 55.

A junction J2 of the diode 54 and the drive capacitor 55 is connected to the low voltage side terminal 1b via a photocoupler light-receiving device 39 and an OFF-control capacitor 53. A series junction J3 of the photocoupler light-receiving device 39 and the OFF-control capacitor 53 is connected to a base of the OFF-control transistor 5.

The series junction J3, namely, the base of the OFF-control transistor 5, is connected to a junction J4 of the FET 3 and the primary current detection resistor 51, via an electrical resistor 52. When a voltage caused by the primary current detection resistor 51 is equal to or more than a predetermined value, a base voltage increases whereby ON operation of the OFF-control transistor 5 is executed.

The photocoupler light-receiving device 39 is optically coupled to and driven by a photocoupler light-emitting device 35 on the secondary side of the transformer 2. Accordingly, when light is received from the photocoupler light-emitting device 35, current flows from the junction J2 to the junction J3 that is proportional to a received light amount.

A rectifying smoothing circuit of the output side is formed on the secondary side of the secondary output winding 2c by a rectifying diode 4 and a smoothing capacitor 13. The rectifying diode 4 is connected in-series to the secondary output winding 2c, and the smoothing capacitor 13 is connected in parallel to the secondary output winding 2c.

Further, the self-excited switching power supply circuit 10 is provided with a circuit for monitoring and stabilizing an output voltage between a high voltage side output line 20a and a low voltage side output line 20b.

In other words, voltage dividing resistors 30 and 31 are connected in-series between the high voltage side output line 20a and the low voltage side output line 20b of the rectifying smoothing circuit. An intermediate tap 32 of the voltage dividing resistors 30 and 3, is connected to an inverted input terminal of an differential amplifier 33, and inputs an output detection voltage, which is a divided voltage derived from the output voltage, to the inverted input terminal. Further, a reference power supply 34 is connected between a non-inverted input terminal of the differential amplifier 33 and the low voltage side output line 20b, and inputs a reference voltage to the non-inverted input terminal for comparison with the output detection voltage.

The output side of the differential amplifier 33 is connected to the photocoupler light-emitting device 35 that lights in accordance with an output value of the differential amplifier 33 by connecting other side to the high voltage side output line 20a via an electrical resistor 36. The photocoupler light-emitting device 35 is optically coupled to the photocoupler light-receiving device 39 on the primary side, as described previously.

Alternating current negative feedback devices 37 and 38 are connected between the output and the inverted input terminal of the differential amplifier 33.

Figure 2A:
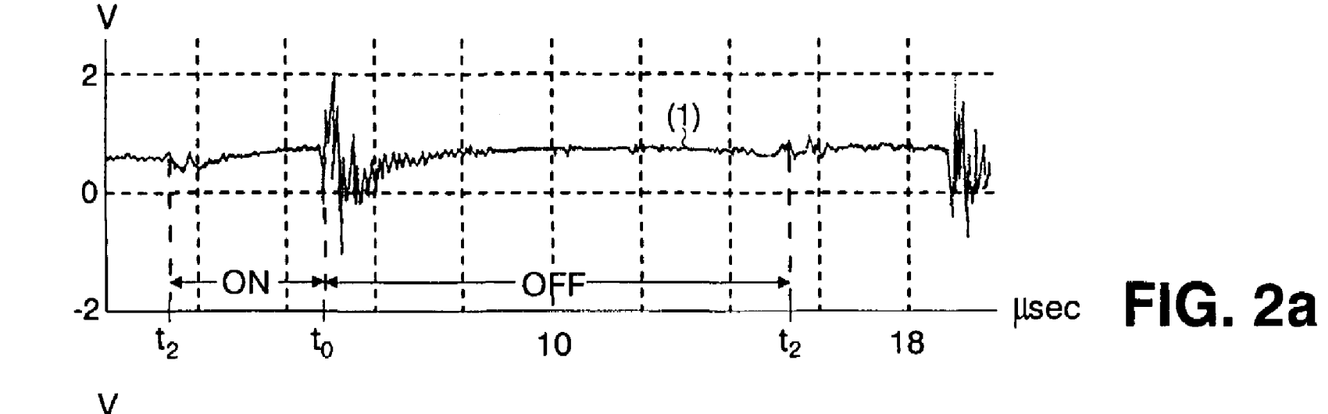
FIGS. 2a–2d show waveform diagrams for respective sections of the self-excited switching power supply circuit 10 when self-excited oscillation operation is being executed with (a) showing a base voltage waveform (1) of an OFF-control transistor 5; (b) showing a gate voltage waveform (2) of a FET 3; (c) showing a drain current waveform (3) of the FET 3; and (d) showing a drain voltage waveform (4) of the FET 3.
Figure 2B:
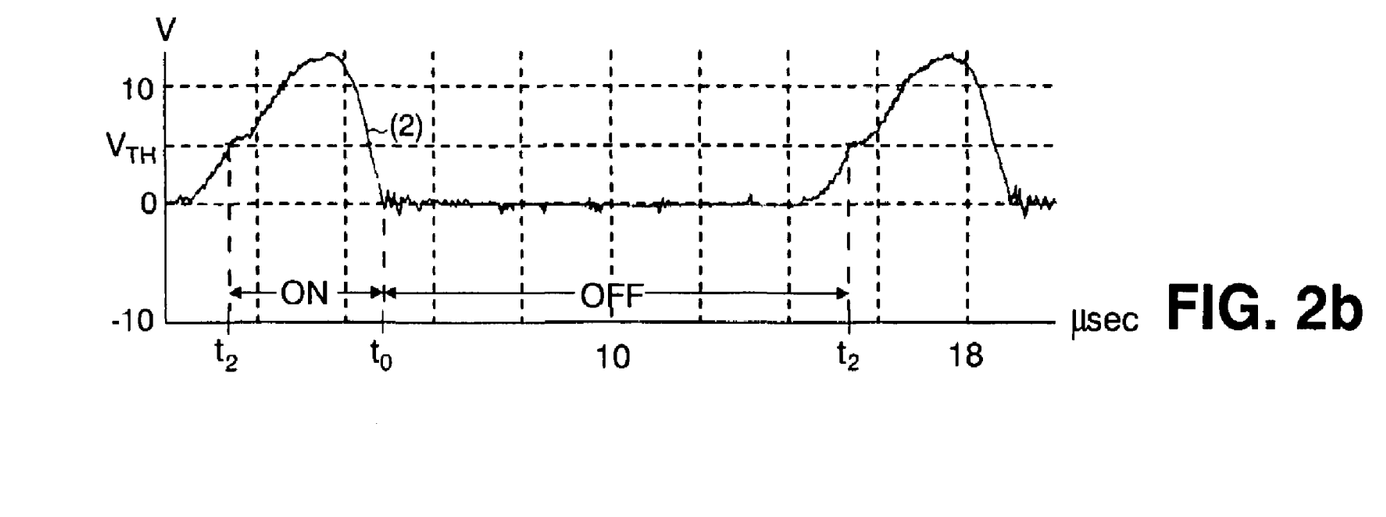
Figure 2C:
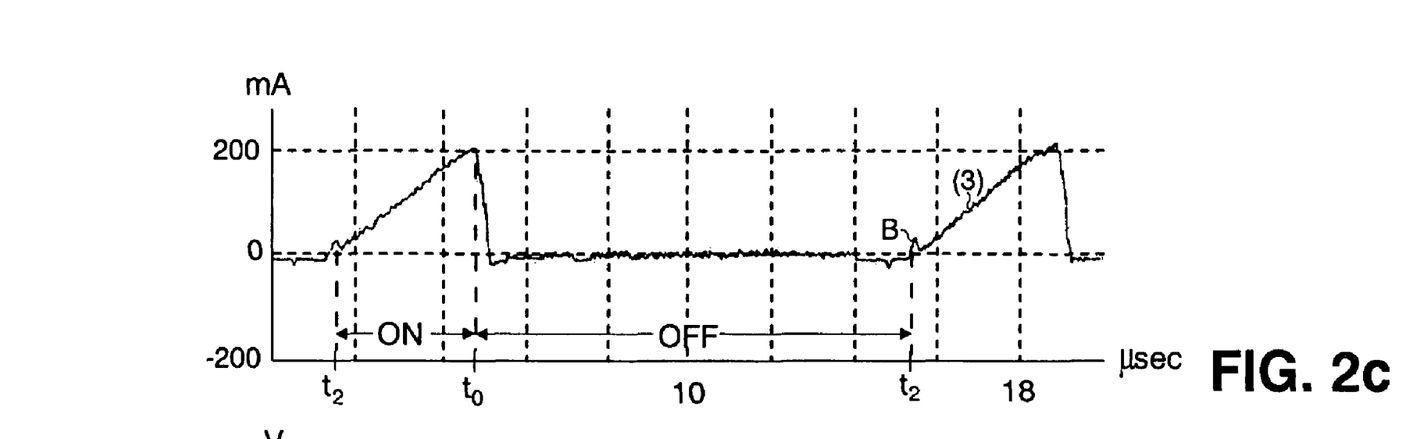
Figure 2D:
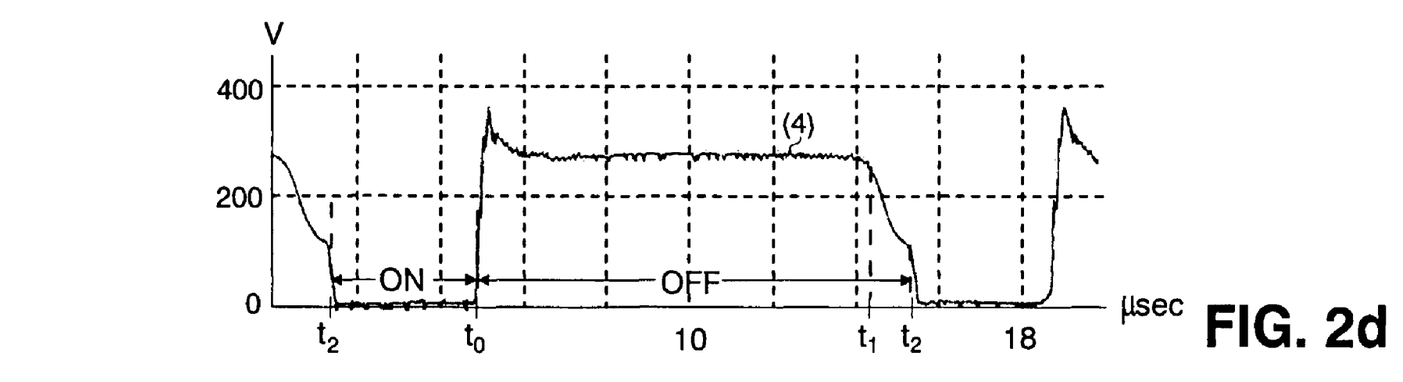
Figure 3:
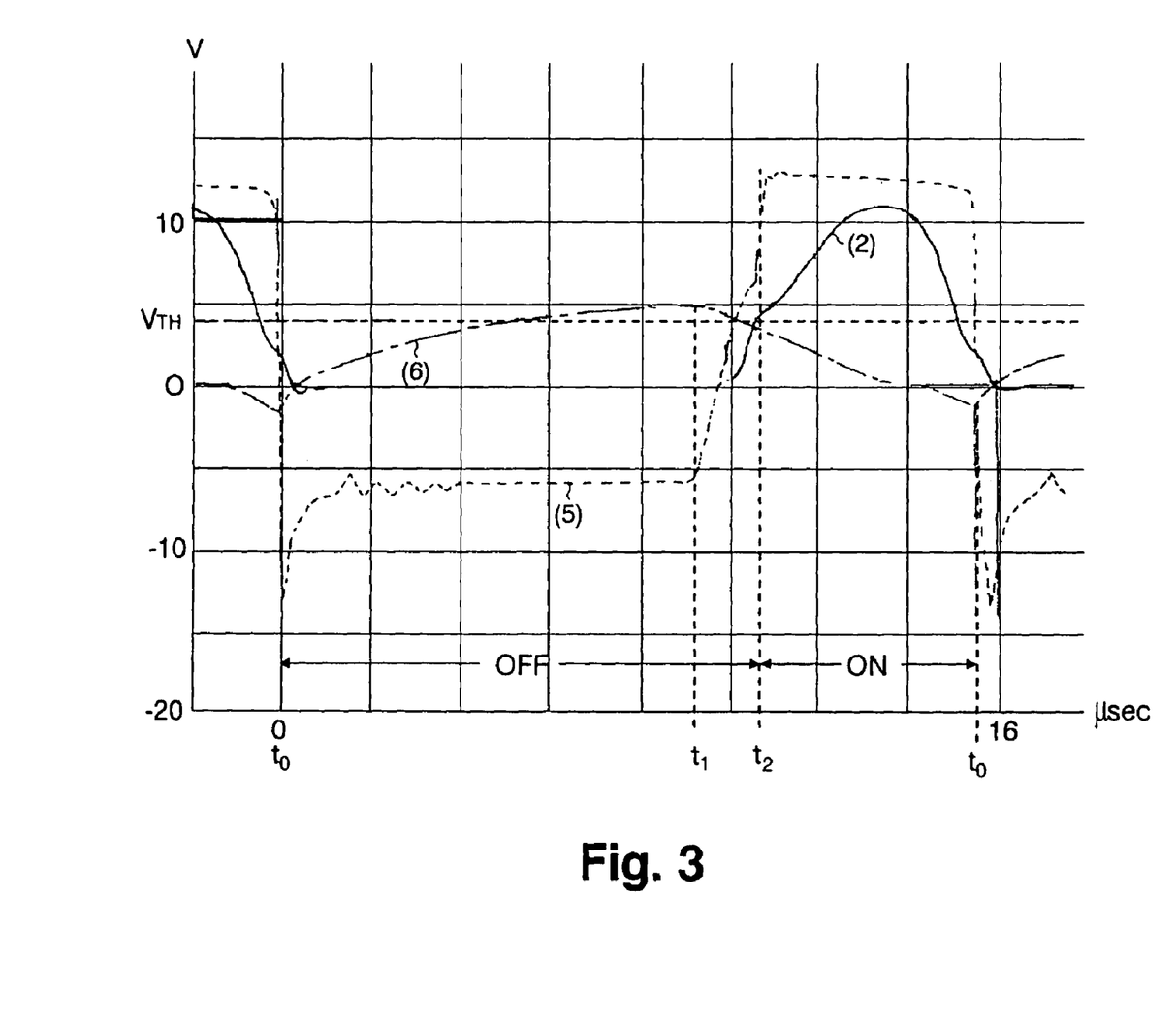
FIG. 3 is a graph showing respective enlarged waveform diagrams for respective sections of the self-excited switching power supply circuit 10 when self-excited oscillation operation is being executed with the gate voltage waveform (2) of the FET 3 and a voltage waveform (5) of a first feedback winding 2b side terminal of a feedback capacitor 12 and a charge voltage waveform (6) of the feedback capacitor 12.

Hereinafter, an operation of the self-excited switching power supply circuit 10 configured in the above manner will be described with reference to FIGS. 1 to 3. FIGS. 2 and 3 correspond to FIGS. 5 and 6, described earlier, and show respective waveforms of sections of the self-excited switching power supply circuit 10 with self-excited oscillation operation is being executed thereby. More specifically, in FIG. 2, (a) shows a voltage of the series junction J3, namely, a base voltage waveform (1) of the OFF-control transistor 5; (b) shows a gate voltage waveform (2) of the FET 3; (c) shows a drain current of the FET 3 namely, a primary winding current waveform (3) that flows in the primary winding 2a; and (d) shows a drain voltage waveform (4) of the FET 3.

In addition, waveform diagrams (2), (5) and (6) shown in FIG. 3 are, respectively, the gate voltage waveform (2) of the FET 3; a voltage waveform (5) of the first feedback winding 2b side terminal of the feedback capacitor 12; and a charge voltage waveform (6) of the feedback capacitor 12 as compared with the voltage of the first feedback winding 2b side terminal.

First, when a direct current voltage of around 200 V is generated between a high voltage side terminal 1a and the low voltage side terminal 1b of the direct current power supply 1, the feedback capacitor 12 is charged via the start-up resistor 21 and the feedback resistor 23 by the power supply voltage, which has been divided to one-sixteenth by the start-up resistor 21 and the electrical resistor 25 (Note that, in FIG. 1, the electrode toward the bottom is positive, and that toward the top is negative).

Accordingly, the charge voltage of the feedback capacitor 12 being charged rises gradually, and when the charge voltage reaches the threshold voltage $V_{TH}$ of the FET 3, positive bias voltage is applied to the gate of the FET 3, whereby the FET 3 is turned on, and the drain and source become electrically continuous.

After the FET 3 is turned on, an exciting current starts to flow from the direct current power supply 1 to the primary winding 2a that is connected in-series therewith, whereby an induced electromotive force is generated in each of the windings of the transformer 2 such that energy is stored therein. An induced voltage generated in the feedback winding 2b (refer to the section between $t_2$ and $t_0$ of (5) in FIG. 3) is superimposed on a charge voltage of the feedback capacitor 12 (refer to (6) of FIG. 3), whereby the gate voltage (refer to (b) of FIG. 2, and (2) of FIG. 3) of the FET 3 is maintained at a voltage (an ON voltage) that is equal to or more than the threshold voltage $V_{TH}$ thereof.

At this time, a voltage generated at the junction J4 on the FET 3 side of the primary current detection resistor 51 by a current flowing in the primary winding 2a charges the OFF-control capacitor 53 via the electrical resistor 52. The current flowing in the primary winding 2a increases in an almost linear manner along with elapse of time following turning on of the FET 3. Accordingly, the charge voltage of the OFF-control capacitor 53 also increases.

When the charge voltage of the OFF-control capacitor 53 reaches to a bias voltage of the OFF-control transistor 5, electrical continuity is established between the collector and the emitter, and the FET 3 is turned off because of the gate thereof being effectively short circuited with the low voltage side terminal 1b (in this case, the electric potential of the low voltage side terminal 1b, for example, zero V) by the OFF-control transistor 5.

When the FET 3 is turned off, the current flowing in the transformer 2 is effectively interrupted, and a so-called flyback voltage (an induced counter-electromotive force) is generated in each of the windings (refer to the section between time $t_0$ and time $t_1$ in (d) of FIG. 2). At this time, the flyback voltage generated in the secondary output winding 2c is rectified and smoothed by the rectifying smoothing circuit formed by the rectifying diode 4 and the smoothing capacitor 13, and then output as electric power supplied to a load connected between the high and low voltage side output lines 20a and 20b.

Note that the flyback voltage generated in the first feedback winding 2b has a proportional relationship with the flyback voltage generated in the secondary output winding 2c because of the load connected to the output side. As a result of the flyback voltage generated in the first feedback winding 2b (refer to the section between time to and time $t_1$ of (5) of FIG. 3), the feedback capacitor 12 is charged (refer to the section between time $t_0$ and time $t_1$ of (6) in FIG. 3; the bottom electrode in FIG. 1 is positive, and the top one negative). Accordingly, when the charge voltage of the feedback capacitor 12 is sufficient, the FET 3 is turned on again.

While the output voltage between the high voltage side output line 20a and the low voltage side output line 20b (which is derived from the rectified and smoothed flyback voltage generated in the secondary output winding 2c) has not reached a set voltage that is determined by the reference voltage of the reference power supply 34 (hereinafter referred to as the "transient state"), the photocoupler light-receiving device 39 is not driven, as will be described hereinafter. Accordingly, the base voltage of the OFF-control transistor 5 is below the bias voltage. However, the path between the base and the collector of the OFF-control transistor 5 act as an equivalent diode, whereby the feedback capacitor 12 is charged from the first feedback winding 2b with the charging current passing along a path from the primary current detection resistor 51, to the electrical resistor 52, to the base and then collector of the OFF-control transistor 5, and then to the feedback resistor 23.

As shown in (d) of FIG. 2, once discharge of the electric energy stored in the secondary output winding 2c caused by the induced counter-electromotive force is completed at time $t_1$, the voltage waveform (4) of the FET 3 side of the primary winding 2a starts to freely oscillate around the 200 V power supply voltage because of parasitic capacitance of the FET 3, stray capacitance in the primary winding 2a, and inductance of the primary winding 2a, as shown by the dashed-line that extends from the solid line in (4) of FIG. 2. As the voltage drops, the polarity of the primary winding 2a reverses.

Similarly, as can be seen from (5) of FIG. 3, the voltage of the feedback capacitor 12 side of the first feedback winding 2b (which oscillates in proportion to the free oscillation of the primary winding voltage) increases and reverses polarity following ceasing at time $t_1$ of the flyback voltage applied as reverse bias on the gate, and is thus applied as forward bias voltage on the gate of the FET 3. Then, the charge voltage of the feedback capacitor 12, which has been charged up to this point, is additionally applied (refer to (6) of FIG. 3), whereby the gate voltage of the FET 3 exceeds the threshold voltage $V_{TH}$ and the FET 3 is turned on once again. In this way, a series of self-excited oscillation operations are repeated.

Energy stored in the transformer 2 during one oscillation period is substantially proportional to the square of an ON time of the FET 3, namely, the time from when the FET 3 is turned on until when the base voltage of the OFF-control transistor 5 reaches the bias voltage. However, in the transient state in which the output voltage of the secondary side has not reached the set voltage, the photo couplers 35 and 39 do not operate, and thus do not contribute to the increase of the base voltage. Accordingly, the FET 3 operates in accordance with a maximum ON time determined by the resistance of the primary current detection resistor 51.

Energy stored in the transformer 2 during one oscillation period in which ON time is set the maximum ON time is more than the energy consumed by the load. Thus, the output voltage increases every oscillation until it reaches the set voltage. Once the output voltage exceeds the set voltage, the FET 3 switches to a normal oscillation operation, described below, which is controlled by the circuit for stabilizing the output voltage.

When the output voltage between the high voltage side output line 20a and the low voltage side output line 20b exceeds the set voltage, the divided voltage of the intermediate tap 32 input to the inverted input terminal of the differential amplifier 33 also increases, whereby the potential difference of this divided voltage and the reference voltage of the reference power supply 34 is reversed and amplified, such that a potential is reached that exceeds a light threshold value of the photocoupler light-emitting device 35.

Accordingly, the photocoupler light-emitting device 35 emits light, which is received by the photocoupler light-receiving device 39. As a result, a current that is proportional to the light amount begins to flow from the junction J2 to the junction J3 (the base of the OFF-control transistor 5).

While the FET 3 is ON, the induced electromotive force generated in the second feedback winding 2d is applied to the diode 54 in the reverse direction, and thus is not transmitted to the base of the OFF-control transistor 5. However, during the OFF operation period of the FET 3 immediately prior to this oscillation, the drive capacitor 55 is charged by the flyback voltage generated in the second feedback winding 2d. Accordingly, discharge current flows from the drive capacitor 55 to the junction J3, whereby the OFF-control capacitor 53 is charged, and the base voltage is increased more rapidly by additional application of voltage generated in the primary current detection resistor 51 (which is caused by flow of the primary winding current) via the electrical resistor 52.

As a result, the OFF-control transistor 5 is rapidly turned on, and the FET 3 turned off. Accordingly, the ON time of the FET 3 is short, and the output voltage reduces. Note that, when the output voltage reduces to below the set voltage, the photocoupler light-emitting device 35 does not emit light, and thus the current from the photocoupler light-receiving device 39 is interrupted. Therefore, the OFF-control capacitor 53 is only charged by voltage drop of the primary current detection resistor 51. As a result, turning on of the OFF-control transistor 5 is delayed and the ON time of the duty factor of the FET 3 is lengthened, whereby the output voltage increases. Set voltage control of the output voltage is thus executed using the above described process.

In the normal oscillation operation described above, as shown in (a) of FIG. 2, when the FET 3 is turned off at time $t_0$, the base voltage of the OFF-control transistor 5 reaches the bias voltage of 0.6 V. Accordingly, continuity is established between the collector and emitter and the voltage of them becomes substantially equal to ground potential. However, during the OFF operation period of the FET 3, the base voltage is maintained at a voltage above the bias voltage even during the period when the output voltage of the secondary side exceeds the set voltage.

In other words, even during the OFF operation period of the FET 3, the photocoupler light-emitting device 35 actually remains lit until the output voltage becomes less than the set voltage by the load connected between the output lines 20a and 20b consumes energy stored in the transformer 2. Accordingly, while the photocoupler light-receiving device 39 conducts, the OFF-control capacitor 53 is charged by the flyback voltage generated in the second feedback winding 2d, and this charge voltage increases the base voltage to equal to or more than the bias voltage.

Even during the OFF operation period of the FET 3, electrical continuity of the collector and the emitter is established during the period when the base voltage of the OFF-control transistor 5 has reached the bias voltage. Accordingly, the feedback capacitor 12 is charged (in FIG. 1, the bottom electrode is positive, and the top one negative) by the flyback voltage generated in the first feedback winding 2b, with the charging current passing along a path though the emitter and collector of the OFF-control transistor 5, and then the feedback resistor 23.

With the self-excited switching power supply circuit 10 according to the embodiment of the invention, during the normal oscillation operation, the time constant of the feedback capacitor 12 and the feedback resistor 23 that configure the ON-control circuit is 4. 7 times the length of that of the conventional self-excited switching power supply circuit 100 described above. Accordingly, the feedback capacitor 12 is gradually charged (the section between time $t_0$ and time $t_1$ of (6) in FIG. 3) by the flyback voltage generated in the first feedback winding 2b (refer to the section between time $t_0$ and time $t_1$ of (5) in FIG. 3).

In other words, the time constant of the feedback capacitor 12 and the feedback resistor 23 are set such that the gate voltage of the FET 3 (refer to (2) of FIG. 3), to which the charge voltage of the feedback capacitor 12 (refer to (6) of FIG. 3) is added, exceeds the threshold voltage $V_{TH}$ at the time when an initial maximum value of the voltage is reached at time $t_2$ following discharge of the energy stored in the transformer 2 from the secondary output winding 2c at time $t_1$, and free oscillation and polarity reversal of the voltage (refer to (5) of FIG. 3) of the feedback capacitor 12 side of the first feedback winding 2b. Note that, the reason why the gate voltage of the FET 3 in FIG. 3 does not equal a value obtained by adding the voltage of one side of the first feedback winding 2b and the charge voltage of the feedback capacitor 12 is due to the voltage drop of the feedback resistor 23.

The first feedback winding 2b and the primary winding 2a freely oscillate such that respective amplitudes thereof correspond to turns ratio there between. Moreover, the respective amplitudes progressively decay such that when the voltage of the positive side of the first feedback winding 2b reaches the initial maximum value at time $t_2$, the voltage of the FET 3 side (the drain of the FET 3) of the primary winding 2a reaches its minimal value. In other words, when the FET 3 is turned on at time $t_2$ because of the gate voltage thereof (refer to (b) of FIG. 2) exceeding the threshold voltage $V_{TH}$, the drain voltage (refer to (d) of FIG. 2) of the FET 3 is at a minimal voltage of around 120 V. Then, following turning on, the drain voltage reduces from around 120 V to zero V, and exciting current begins to flow in the primary winding 2a.

Accordingly, electrical charge stored because of the flyback voltage in the stray capacitance between the windings of the primary winding 2a and in the parasitic capacitance between the drain and source of the FET 3 starts to discharge when the polarity of the primary winding 2a reverses because of free oscillation thereof. Then, following this, when the low voltage side voltage of the primary winding 2a reaches a minimum at time $t_2$, the FET 3 is turned on. Accordingly, as a result of shorting by the low voltage side terminal 1b of the direct current power supply 1, the discharging electrical charge becomes a gradual discharge current.

Thus, only a slight discharge current, as shown by B of (c) in FIG. 2, shows in the primary winding current immediately after turning on of the FET 3, whereby loss of the switching devices, like the FET 3, and causes of noise are reduced.

Further, in the transient state described above, the feedback capacitor 12 is charged in accordance with the time constant determined by the resistance value derived from the primary current detection resistor 51, the electrical resistor 52 and the feedback resistor 23 together, and the capacitance value of the feedback capacitor 12. Accordingly, the feedback capacitor 12 is charged even more slowly than is indicated by the charge voltage waveform (6) shown in FIG. 3, whereby it is necessarily the case that the gate voltage does not reach the threshold voltage $V_{TH}$ as insufficient charge voltage until the time $t_2$ when the voltage of the positive side of the first feedback winding 2b reaches the initial maximum value. Further, even during the normal oscillation operation, the flyback voltage is different depending on the load connected to the secondary side, whereby the charge voltage at time $t_2$ changes. Accordingly, in order to reliably execute turning on of the FET 3, the time constant of the ON-control circuit may be set such that, prior to when the initial maximum value is reached following reversal of the polarity of the first feedback winding 2b, the gate voltage exceeds the threshold voltage $V_{TH}$.

According to this embodiment, a large discharge current is not generated when the FET 3 is turned on, and charging of the feedback capacitor 12 for turning on of the FET 3 can be executed via the OFF-control transistor 5, without using a path for charging such as the Zener diode 6 provided in the conventional circuit.

What is claimed is:

1. A self-excited switching power supply circuit comprising:
   a transformer including a primary winding, a secondary output winding, and a feedback winding;
   an oscillating field effect transistor which is connected in-series with the primary winding to a direct current power supply and which is turned on when a gate voltage of the transistor reaches a threshold voltage;
   a start-up resistor that is connected between a high voltage side terminal of the direct current power supply and a gate of the oscillating field effect transistor;
   an ON-control circuit which includes a feedback capacitor and a feedback resistor that are connected in-series between the feedback winding and the gate of the oscillating field effect transistor; and
   an OFF-control transistor which is connected between the gate of the oscillating field effect transistor and a low voltage side terminal of the direct current power supply, and which, following a turn-on operation of the oscillating field effect transistor, turns the oscillating field effect transistor off after a predetermined time has elapsed by causing electrical continuity to be established between the gate and the low voltage side terminal,
   wherein after the oscillating field effect transistor is turned off, the gate voltage is raised to the threshold voltage by a charge voltage of the feedback capacitor that is charged by a flyback voltage generated in the feedback winding to turn the oscillating field effect transistor on once again, and a time constant of the ON-control circuit is set such that the gate voltage exceeds the threshold voltage when, at the least, a polarity of a voltage of the feedback winding is reversed because of discharge of energy stored in the secondary output winding of the transformer.

2. The self-excited switching power supply circuit according to claim 1,
   wherein the time constant of the ON-control circuit is set such that the gate voltage exceeds the threshold voltage at a time when the voltage of the feedback winding reaches an initial maximal value because of discharge of energy stored in the secondary output winding of the transformer.

* * * * *